(12) United States Patent
Jourde et al.

(10) Patent No.: US 9,516,900 B2
(45) Date of Patent: Dec. 13, 2016

(54) PROTECTIVE STRETCHABLE MATERIAL AND GARMENT MADE THEREWITH

(71) Applicant: ID LAB INC., Montreal (CA)

(72) Inventors: Bastien Jourde, Montreal (CA);
Martin Laberge, Montreal (CA);
Philippe Lefebvre, Montreal (CA)

(73) Assignee: ID LAB INC., Montreal (CA)

( * ) Notice: Subject to any disclaimer, the term of this patent is extended or adjusted under 35 U.S.C. 154(b) by 0 days.

(21) Appl. No.: 14/772,551

(22) PCT Filed: Jun. 6, 2014

(86) PCT No.: PCT/IB2014/062040
§ 371 (c)(1),
(2) Date: Sep. 3, 2015

(87) PCT Pub. No.: WO2014/195923
PCT Pub. Date: Dec. 11, 2014

(65) Prior Publication Data
US 2016/0088877 A1    Mar. 31, 2016

Related U.S. Application Data

(60) Provisional application No. 61/832,801, filed on Jun. 8, 2013, provisional application No. 61/916,564, filed on Dec. 16, 2013.

(51) Int. Cl.
*A41B 9/12* (2006.01)
*A41D 13/015* (2006.01)
(Continued)

(52) U.S. Cl.
CPC . *A41B 9/12* (2013.01); *A41B 9/02* (2013.01); *A41B 9/04* (2013.01); *A41D 13/015* (2013.01);
(Continued)

(58) Field of Classification Search
CPC ............ A41D 13/015; A41B 9/08; A41B 9/02
(Continued)

(56) References Cited

U.S. PATENT DOCUMENTS 1,290,799 A * 1/1919 Talley ...................... F41H 1/02
152/196
2,462,508 A * 2/1949 Kneibler .................. A41B 9/02
2/401
(Continued)

FOREIGN PATENT DOCUMENTS

EP    0932703 B1    7/2002
EP    1530018 A1    5/2005
(Continued)

OTHER PUBLICATIONS

International Search Report of PCT/IB2014/062040; Sep. 11, 2014, Genevieve Scott.

*Primary Examiner* — Tejash Patel
(74) *Attorney, Agent, or Firm* — BCF LLP (57) ABSTRACT

The present disclosure describes a protective stretchable material and a garment made therewith. The protective stretchable material comprises a first protective fabric, and a second protective fabric partially superposing the first protective fabric. The protective stretchable material further comprises a stretchable structure. The first and second protective fabric are affixed to the stretchable structure in such a manner as to allow movement of the first protective fabric with respect to the second protective fabric while remaining partially superposed upon stretching of the stretchable structure.

24 Claims, 13 Drawing Sheets

(51) Int. Cl.
*A63B 71/12* (2006.01)
*F41H 1/02* (2006.01)
*A41D 13/05* (2006.01)
*A41B 9/02* (2006.01)
*A41B 9/04* (2006.01)
*B32B 5/26* (2006.01)
*A62B 17/00* (2006.01)
*A41D 31/00* (2006.01)

(52) U.S. Cl.
CPC ....... *A41D 13/0537* (2013.01); *A41D 31/0016* (2013.01); *A63B 71/12* (2013.01); *B32B 5/26* (2013.01); *F41H 1/02* (2013.01); *A41D 31/0061* (2013.01); *A62B 17/001* (2013.01); *A63B 71/1216* (2013.01); *A63B 2071/1233* (2013.01); *A63B 2071/1241* (2013.01); *B32B 2307/51* (2013.01); *B32B 2437/00* (2013.01); *B32B 2571/02* (2013.01)

(58) Field of Classification Search
USPC .......................... 2/455, 78.1, 78.3, 404, 237
See application file for complete search history.

(56) References Cited

U.S. PATENT DOCUMENTS

| | | | |
|---|---|---|---|
| 4,681,792 A | 7/1987 | Harpell et al. | |
| 4,813,162 A | 3/1989 | Harris | |
| 5,316,820 A | 5/1994 | Harpell et al. | |
| 5,771,489 A | 6/1998 | Snedeker | |
| 5,966,739 A | 10/1999 | Wagner et al. | |
| 6,260,196 B1 | 7/2001 | Van der Sleesen | |
| 7,770,233 B2* | 8/2010 | Haskell | A41D 13/015 2/69 |
| 7,937,777 B2* | 5/2011 | Sakaguchi | A61F 13/49012 2/400 |
| 8,479,313 B2* | 7/2013 | Jones | A41D 13/0005 2/16 |
| 8,863,319 B2* | 10/2014 | Knight | A42B 3/064 2/411 |
| 2003/0104739 A1 | 6/2003 | Jenkins et al. | |
| 2005/0170221 A1 | 8/2005 | Kim et al. | |
| 2008/0075933 A1 | 3/2008 | Rovers | |
| 2009/0300823 A1 | 12/2009 | Connaghan et al. | |
| 2012/0117700 A1 | 5/2012 | Howell et al. | |
| 2012/0174300 A1 | 7/2012 | Weber et al. | |

FOREIGN PATENT DOCUMENTS

| | | |
|---|---|---|
| EP | 1891869 B1 | 1/2012 |
| EP | 2578986 A2 | 4/2013 |
| WO | 9831249 A1 | 7/1998 |
| WO | 0187432 A2 | 11/2001 |
| WO | 2011079152 A1 | 6/2011 |

\* cited by examiner

PROTECTIVE STRETCHABLE MATERIAL AND GARMENT MADE THEREWITH

FIELD

The present disclosure relates to a protective stretchable material and to a garment made using such protective stretchable material.

BACKGROUND

Protective garments are worn for various activities such as sports, work, construction, security, and law enforcement. Protective garments are usually designed by incorporating a cushioning fabric and/or one or several layers of protective fabric within a sealed pocket. One particular type of protective garment is the ballistic or puncture protection garment, which is worn by various types of law enforcement agents and armed services. The best known ballistic garment is the bulletproof vest. This type of garment is made of front and rear panels, each composed of several layers of ballistic grade material, between which a cushioning may be added to distribute the impact caused by bullets. The distance between the front and rear panels is adjusted by means of Velcro™ strips, which also secure the bulletproof vest on the torso of a wearer.

Protective garments, such as for example ballistic or puncture protection, are also desirable for other parts of the body, such as the lower body, legs, arms and neck. More recent protective fabrics such as ballistic grade materials have become thinner and more flexible, allowing manufacturing of thinner garments. For example, the British Army and United States Army have started providing to soldiers ballistic boxer shorts made of flexible thin ballistic grade material. The ballistic boxer shorts comprise a protective crotch made of flexible ballistic grade material, inserted within a front pocket sewn into regular boxer short fabric. A ballistic undershirt is also provided. The ballistic undershirt also consists of a pocket, in which the flexible ballistic grade material, or multiple layers thereof, is inserted.

Although the new protective fabrics provide an improvement to currently available protective fabrics and garments designed therewith, current protective fabrics could be displaced during movement, thus exposing the wearer to harm. Furthermore, the current protective fabrics cannot be used safely for legs, arms and the neck, which require materials which must follow body movements. It is thus not possible to design adjusted protective garments which include protective fabrics which stretch to follow movements of a wearer with the current protective fabrics and manufacturing methods.

There is thus a need for a providing a material which is protective and stretchable, and to provide garments made of such protective stretchable material.

SUMMARY

The present disclosure relates to a protective stretchable material and a garment made therewith. The protective stretchable material comprises a first protective fabric and a second protective fabric partially superposing the first protective fabric. The stretchable material further comprises a stretchable structure. The first and second protective fabric are affixed to the stretchable structure in such a manner as to allow movement of the first protective fabric with respect to the second protective fabric, while remaining partially superposed upon stretching of the stretchable structure.

BRIEF DESCRIPTION OF THE DRAWINGS

In the appended drawings, similar references denote like parts.

DETAILED DESCRIPTION

The present disclosure relates to a protective stretchable material and a garment made therewith. Throughout the present specification the expression 'protective fabric' is used to refer to any fabric which has one or several protective properties and does not extend or stretch, or does not extend or stretch sufficiently to follow movements of a wearer. Examples of protective fabrics include ballistic grade fabrics, puncture grade fabrics, high resistance yarns and weaves, waterproof materials, impact absorption fabrics, impact dispersion fabrics, etc.

Reference is now made to FIGS. 1-4, which are cross-sectional views of the present protective stretchable material. The present protective stretchable material 10 is composed of at least two protective fabrics 12 and 14. The two protective fabrics 12 and 14 may be identical protective fabrics, different protective fabrics or complementary protective fabrics. For example, if the protective stretchable material 10 is to protect against ballistics, the protective fabric 12 may be made of a fabric, yarn or material having greater ballistic properties than the protective fabric 14, or vice-versa. The protective fabrics 12 and 14 could alternatively or concurrently include impact absorption fabrics and/or impact dispersion fabrics.

The protective fabrics 12 and 14 are affixed to a stretchable structure 16. The stretchable structure 16 may be made of a single stretching material as shown on FIG. 1, or of multiple complementary layers of stretching materials 16A-16D as shown on FIGS. 2-4. The stretchable structure 16 is composed of one or multiple layers of any known stretchable textile, suitable for the application to which the present protective stretchable material will be used. Examples of stretchable textiles which may be used include fabrics including spandex and/or elastane, fabrics which weaving provides stretching properties such as for example cotton, etc. The stretchable structure 16 may provide a two-way stretch, or a four-way stretch.

Affixing 20 of the protective fabrics 12 and 14 to the stretchable structure 16 may be performed by any means known in the art, such as for example stitching, laminating, heat welding, high-frequency welding, gluing, tacking, and stapling. The protective fabrics 12 and 14 may be affixed on each extremity to the same layer of the stretchable structure 16, as shown on FIG. 1, or to different layers 16A-16D of the stretchable structure 16, as shown on FIGS. 2-4.

The protective fabrics 12 and 14 are affixed to the stretchable structure 16 so as to partially superpose one another, and remain partially superposed upon stretching of the stretchable structure 16. Furthermore, stretching of the stretchable structure 16 allows relative movement of the protective fabrics 12 and 14, while maintaining the protective fabrics 12 and 14 partially superposed.

Either or both of the protective fabrics 12 and 14 may be flexible and/or stretchable. The overall construction of the present protective stretchable material 10 is made such that at least partial superposition of the protective fabrics 12 and 14 is maintained, upon stretching of the stretchable structure, including upon stretching or flexing of the protective fabrics 12 and 14, within an intended range of uses of the protective stretchable material 10.

Figure 1:
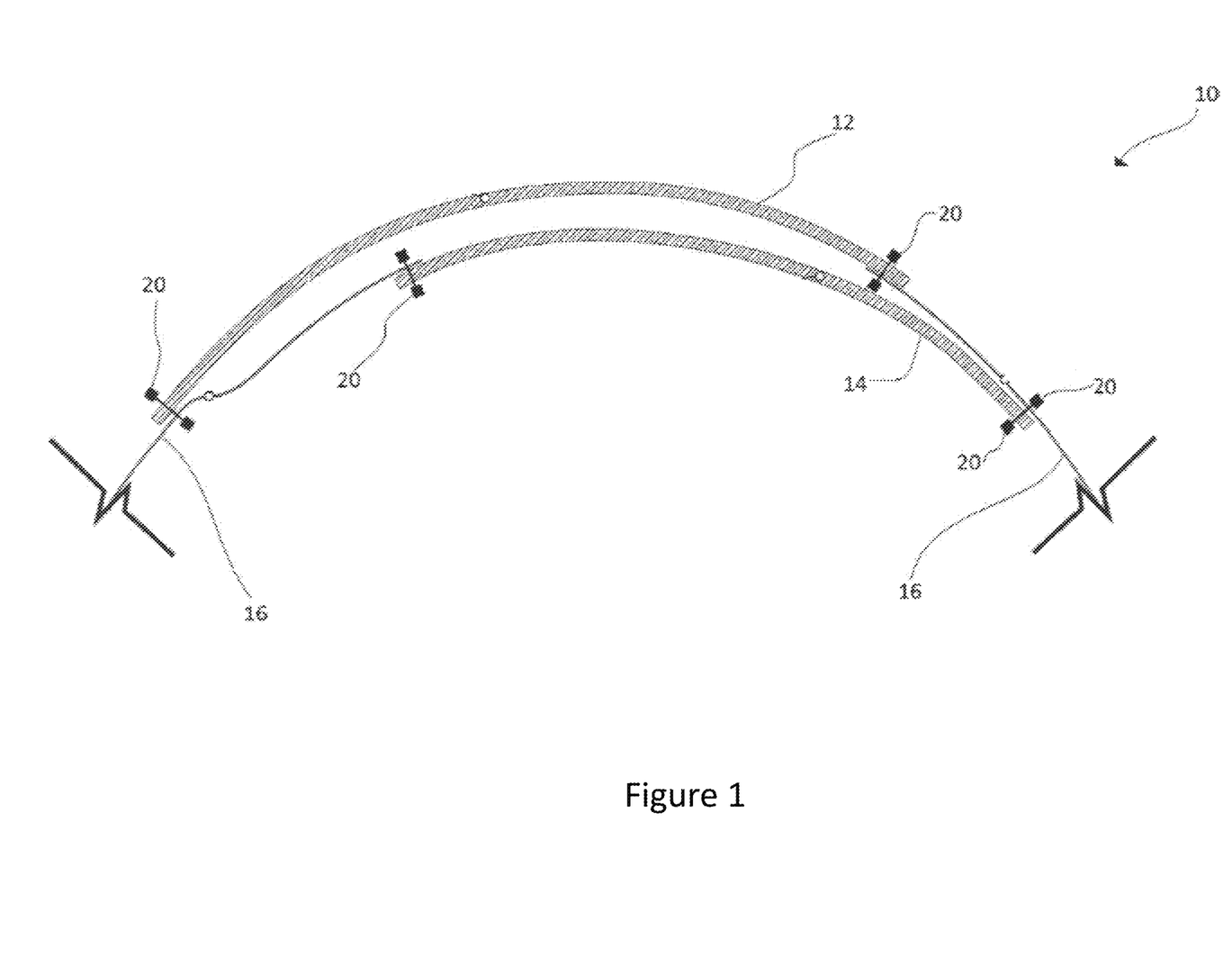
FIG. 1 is cross-sectional view of the present protective stretchable material according to a first embodiment.
Figure 2:
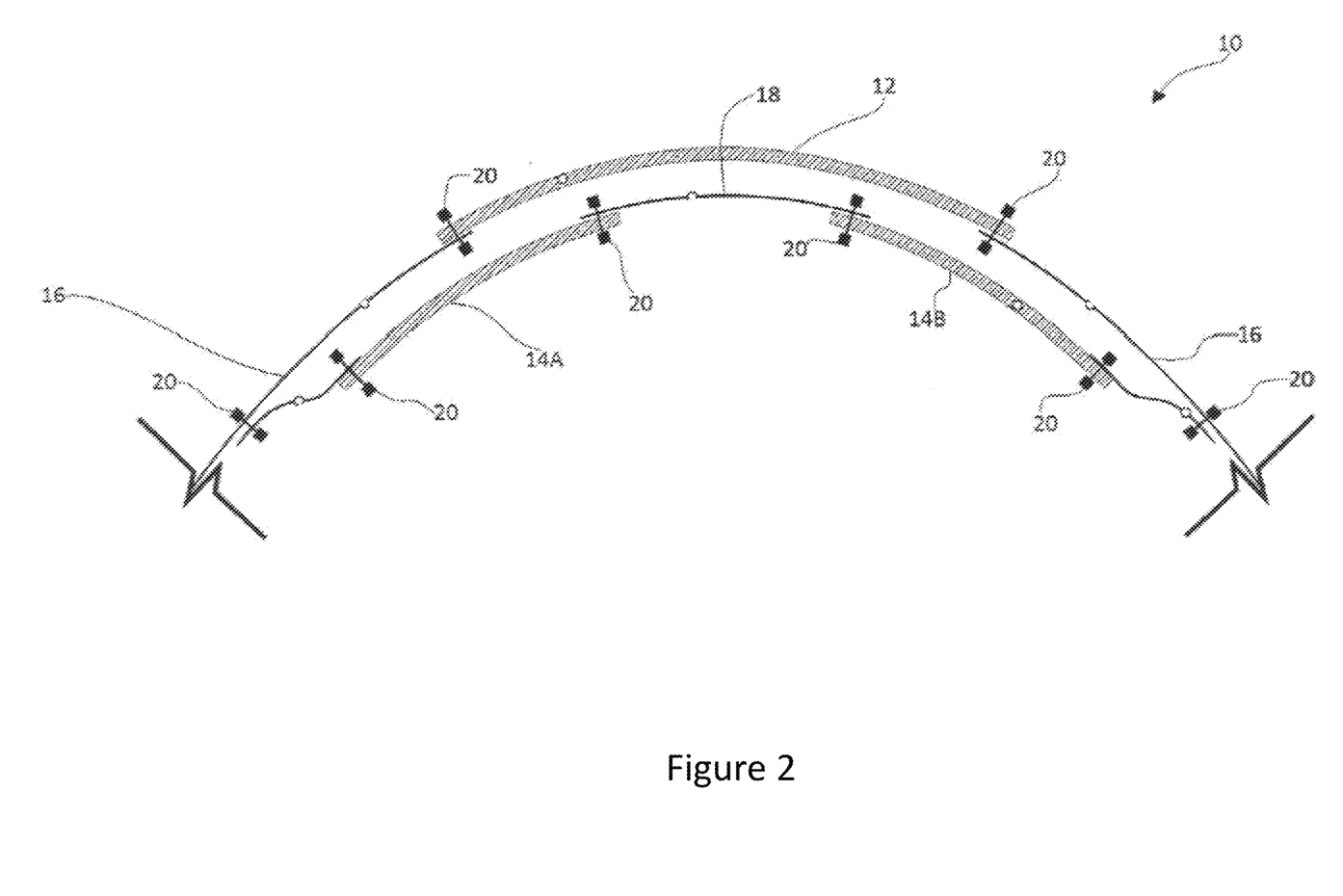
FIG. 2 is a cross-sectional view of a variant of the present protective stretchable material.

Reference is now specifically made to FIG. 2, which depicts a variant of the present protective stretchable material 10. In this variant, the protective fabric 14 is composed of two protective fabrics 14A and 14B having one side affixed to a stretchable fabric 18. The stretchable fabric 18 is not part of the stretchable structure 16. The two protective fabrics 14A and 14B may be affixed to the stretchable fabric 18 by any means previously discussed. The stretchable fabric 18 and each of the two protective fabrics 14A and 14B are superposed by the protective fabric 12.

Figure 3:
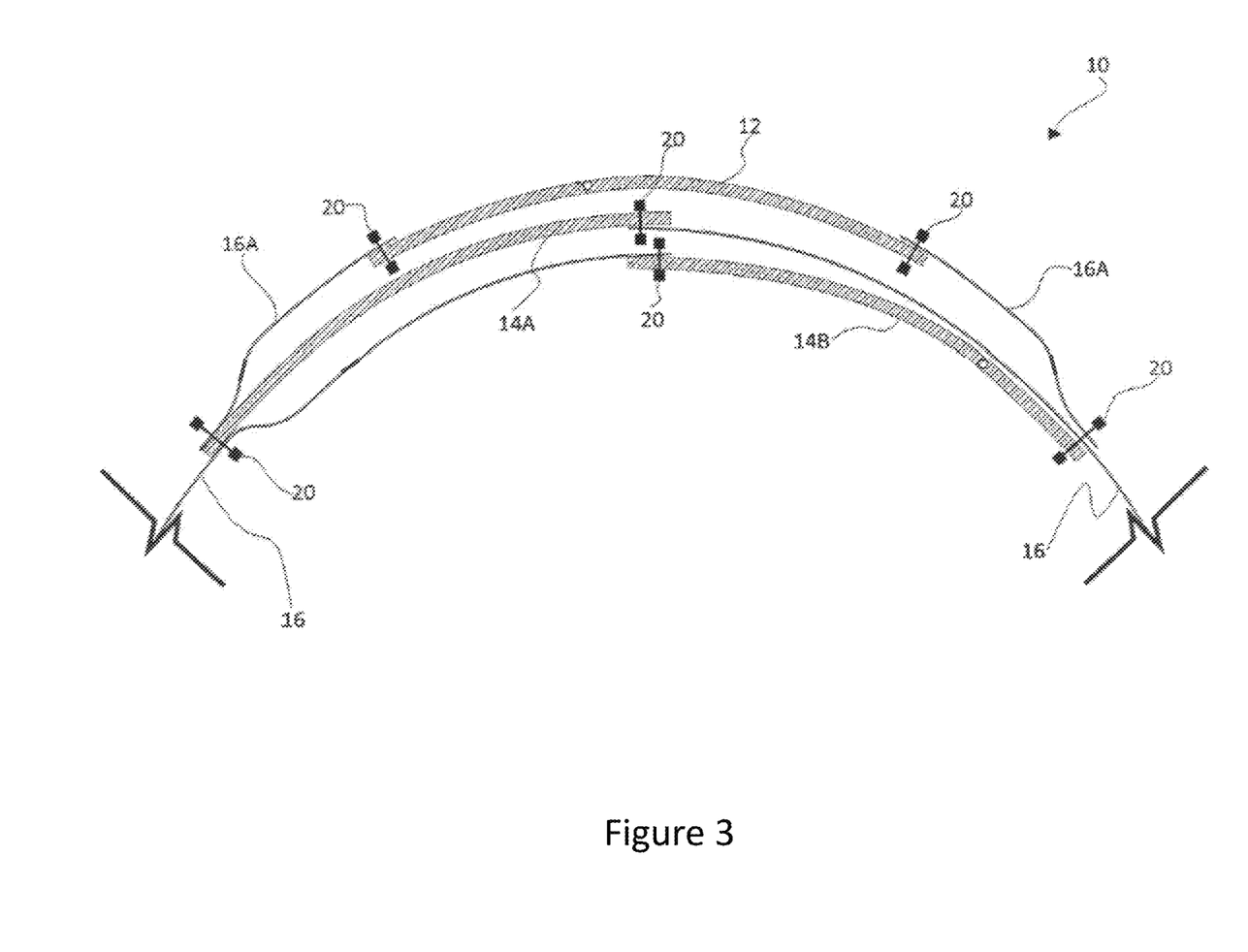
FIG. 3 is a cross-sectional view of another variant of the present protective stretchable material.
Figure 4:
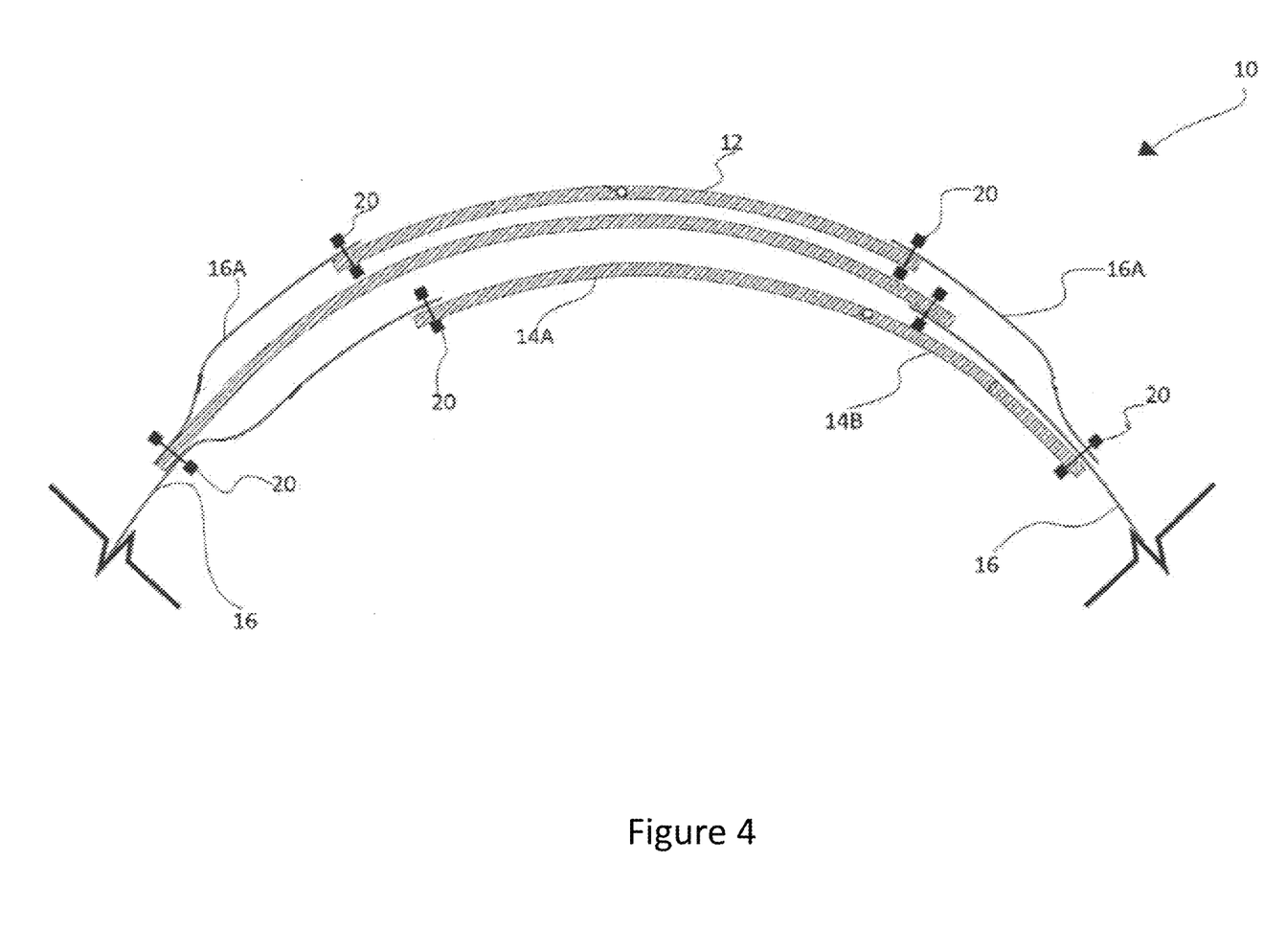
FIG. 4 is a cross-sectional view of another variant of the present protective stretchable material.

Reference is now made to FIGS. 3 and 4, which depict other variants of the present protective stretchable material 10. In these variants, three partially superposed protective fabrics 14A and 14B are depicted. The stretchable structure is multi-layered, so as to provide multiple movement relative movement between the protective fabrics 12, 14A and 14B. As seen on FIG. 3, the protective fabric 12 is affixed near its extremities to layer 16A of the stretchable structure 16. The protective fabric 14A fits mostly underneath the protective fabric 12, and is affixed near one of its extremities to layers 16A and 16 and near its other extremities to layer 16. The protective fabric 14B is also affixed near one of its extremities to layer 16 and near its other extremity to layers 16A and 16. By affixing different extremities of protective fabric to different layers or combined layers of the stretchable structure 16, it is possible to create multilayers of partially superposed protective fabrics, capable of movement therebetween upon stretching of the stretching structure 16, so as to maintain the protective fabrics 12, 14A and 14B in relative position during movement.

As can be seen from FIGS. 3 and 4, it is possible to affix the protective fabrics 12, 14A and 14B along the extremities of the layers of the stretchable structure 16. However, it is also possible to affix the protective fabrics 12, 14A and 14B anywhere along a layer or multiple layers of the stretchable structure 16, so as to provide various configurations of protective stretchable material 10.

It is possible to further provide a cushioning (not shown) between the protective fabrics 12 and 14, or between any combination of protective fabrics, to absorb an impact or distribute the energy received by an impacting object.

Although only four variants have been depicted, it is possible to design and develop protective stretching materials 10 with many more layers than the three protective layers depicted. In fact, the present protective stretchable material 10 could include many more layers of substantially superposed protective materials, affixed to a stretchable structure have multiple layers. The stretchable structure 16 is a convenient way of securing and affixing the protective fabrics 12, 14A and 14B.

Each of the protective fabrics 12, 14A and 14B may be affixed to the stretchable structure 16 on its opposite extremities, or on all its extremities. Thus in the case of a 4-way stretch stretchable structure 16, by affixing the protective fabrics 12, 14A and 14B on different layers of the stretchable structure 16 on all extremities, it is possible to provide a 4-way stretch protective stretching material.

Figure 5:
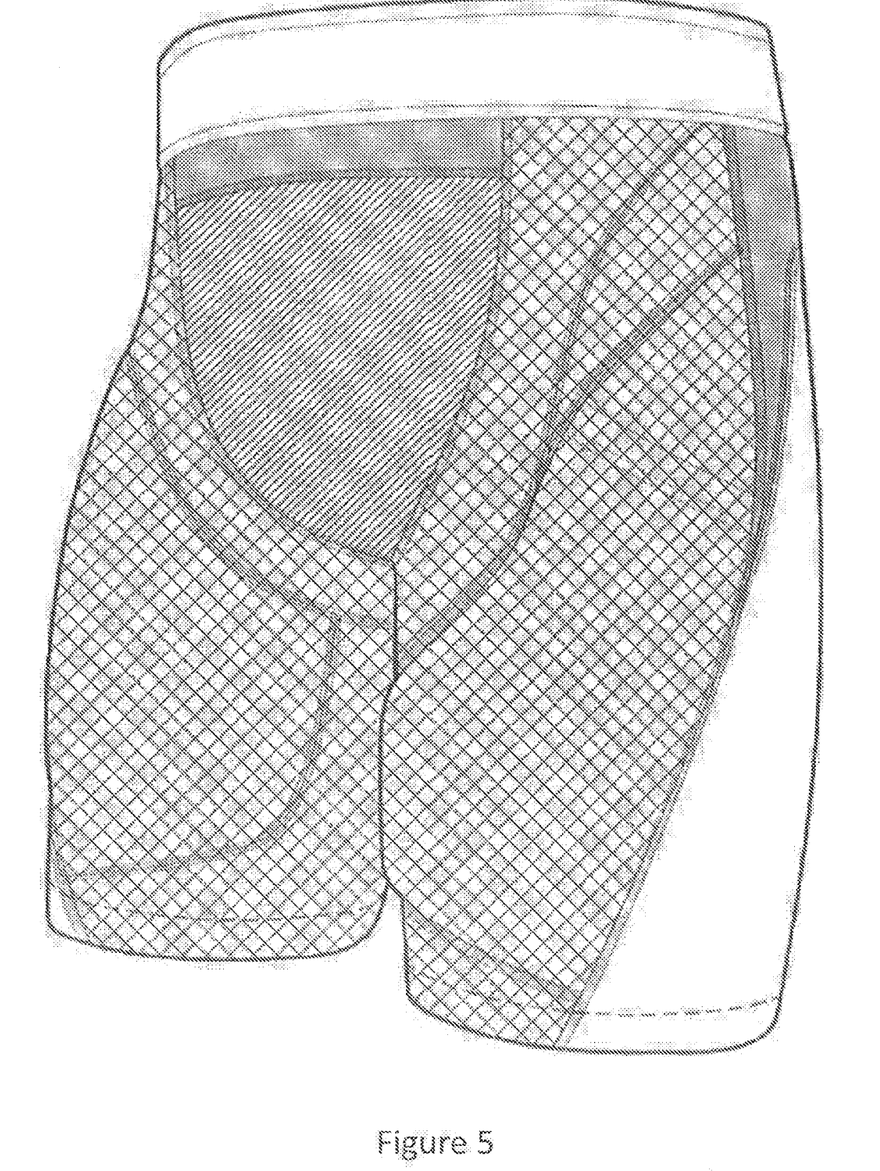
FIG. 5 is a front view of an undergarment made of the present protective stretchable material of any of FIGS. 1-4.
Figure 6:
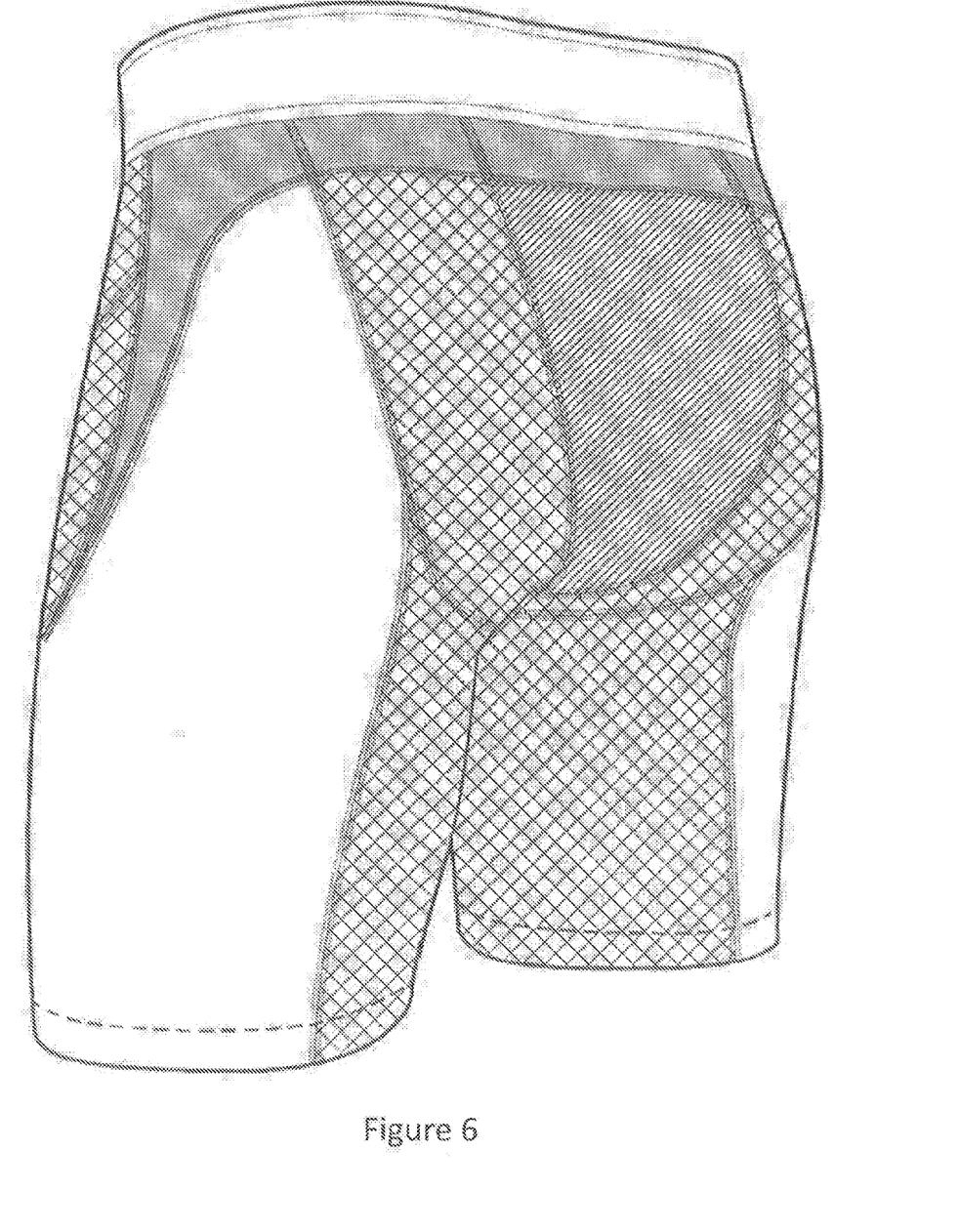
FIG. 6 is a rear view of the undergarment of FIG. 5.
Figure 7:
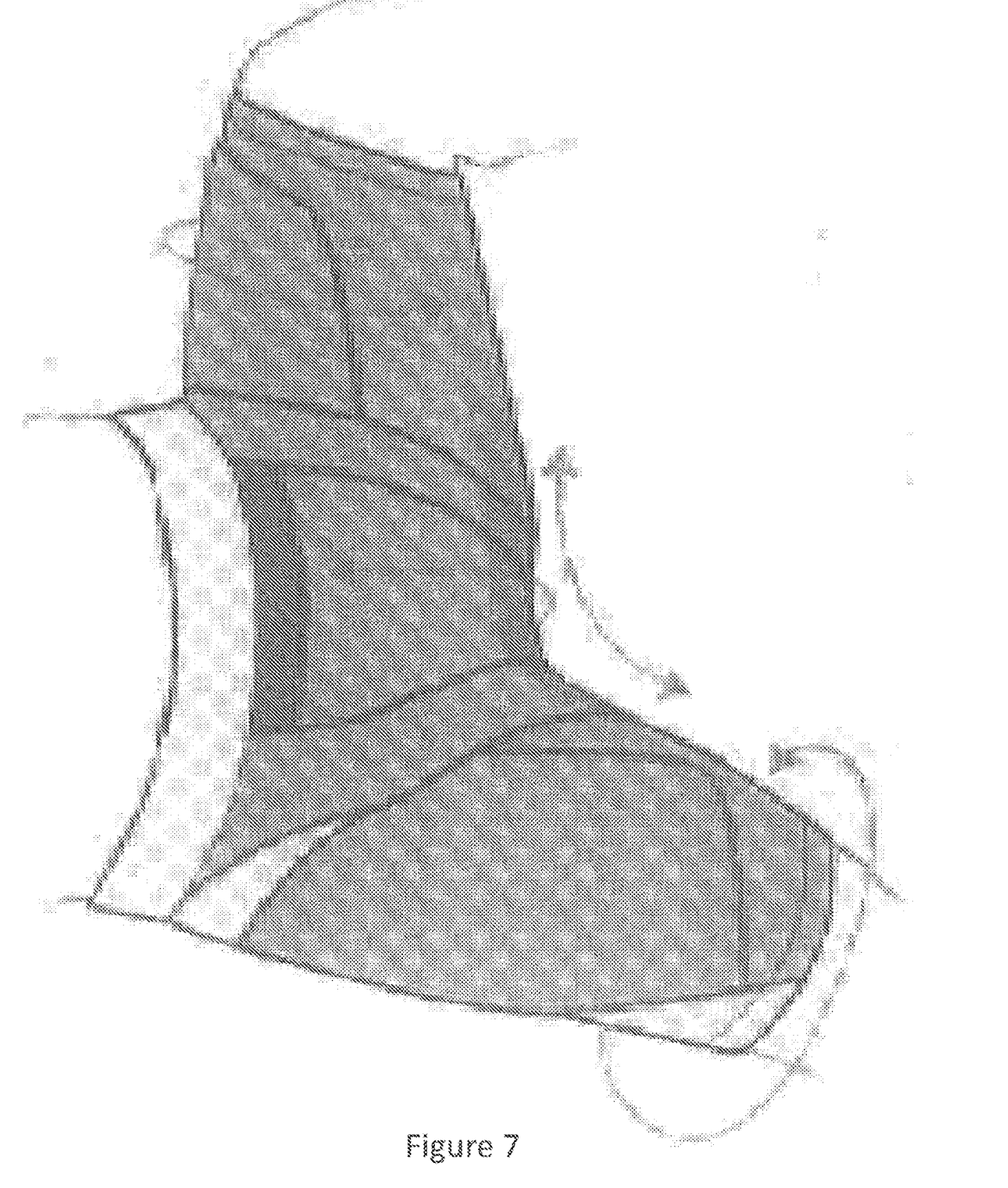
FIG. 7 is a perspective view of the undergarment of FIGS. 5-6, with arrows indicating a stretching direction of the present protective stretchable material.

Reference is now made concurrently to FIGS. 1-7, where FIGS. 5-7 are view of an undergarment having multiple sections made of the present protective stretchable material. The present protective stretchable material is particularly interesting to use in garments which require adjusted fitting, such as for example the undergarment shown in FIGS. 5-7. The present protective stretchable material may be used to cover particularly vulnerable areas of the body, such as certain organs, blood vessels, organs. Because of the stretching capacity of the present protective stretchable material, adjusted garments may be designed, which will follow a wearer's movements. The present protective stretchable material may be used to create complete garments, or used only for certain sections of the garment. To allow greater comfort to the wearer, the stretching direction of the protective stretching material should be taken into consideration when designing and creating a garment, so as to ensure that the stretch of the protective stretching material corresponds to the movements. FIG. 7 represents a garment with 3 different areas using the present protective stretching material. Each section is cut and assembled so as to provide the required stretch, while maintaining protection for the wearer.

Figure 8A:
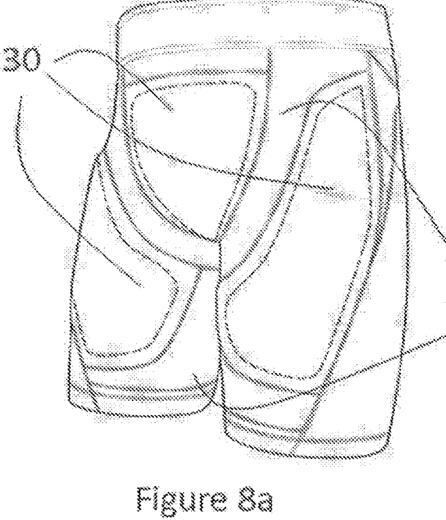
FIGS. 8a, 8b, 8c and 8d are, respectively, a front perspective view of an undergarment showing outer protective material, a front perspective view of the undergarment showing inner protective material, a rear perspective view of the undergarment showing outer protective material, and a rear perspective view of the undergarment showing inner protective material.
Figure 8B:
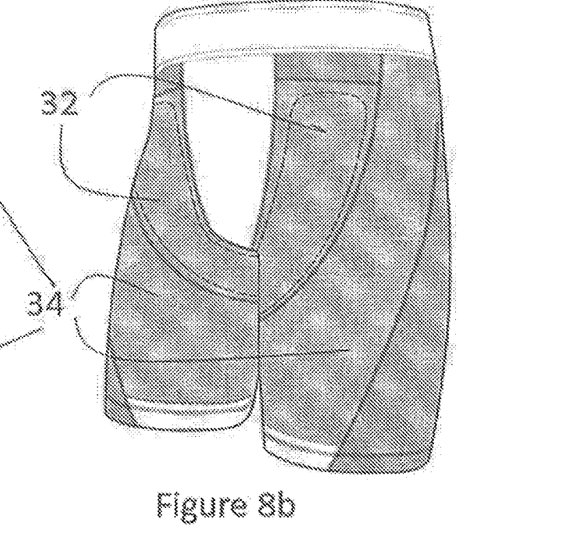
Figure 8C:
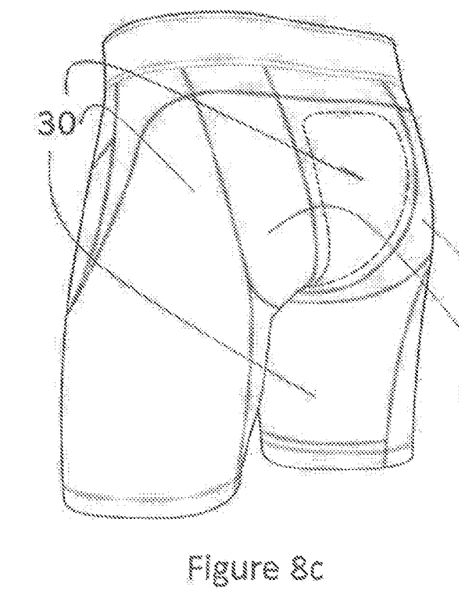
Figure 8D:
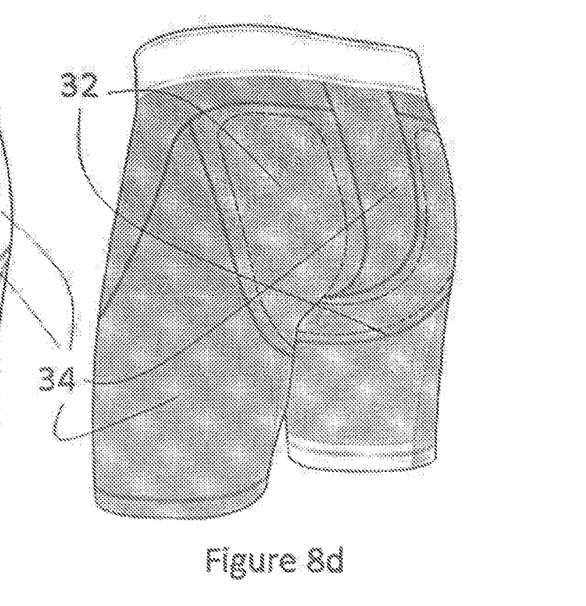
Figure 8E:
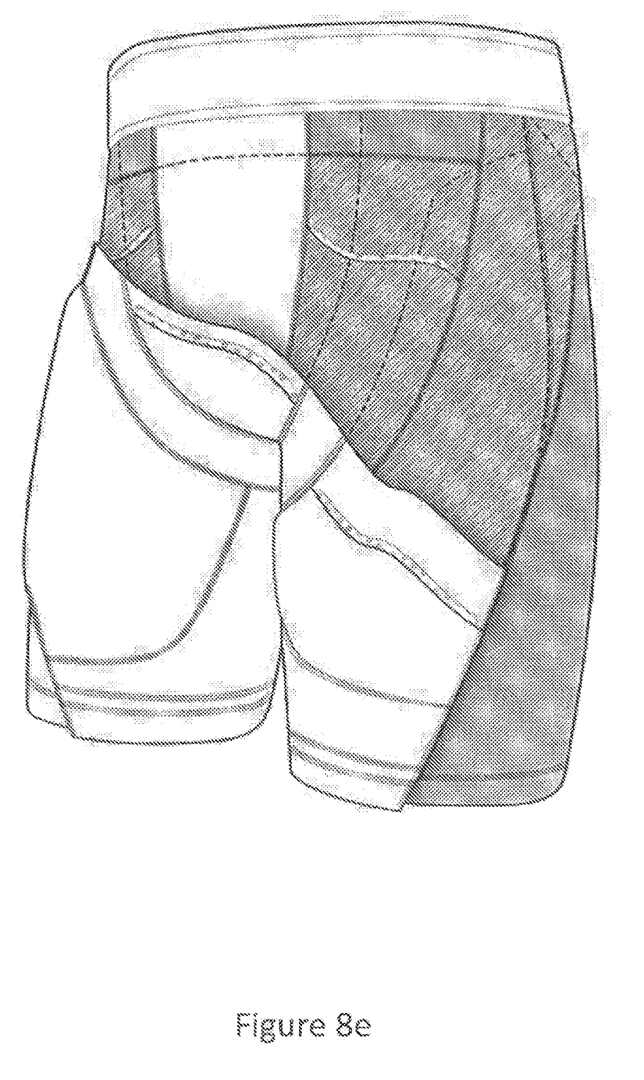
FIG. 8e is a front perspective view of showing a partial overlap of the view of FIG. 8a over the view of FIG. 8b.

FIGS. 8a, 8b, 8c and 8d are, respectively, a front perspective view of an undergarment showing outer protective material, a front perspective view of the undergarment showing inner protective material, a rear perspective view of the undergarment showing outer protective material, and a rear perspective view of the undergarment showing inner protective material. FIG. 8e is a front perspective view of showing a partial overlap of the view of FIG. 8a over the view of FIG. 8b. Areas 30 represent outer protection zones while areas 32 represent inner protection zones and areas 34 represent stretch zones (not all stretch zones are indicated by reference number 34 in order to simplify the illustration). The undergarment having areas 30, 32 and 34 is flexible and easy to wear close to the body while maintaining at least partial overlap of areas 30 and 32 at all times under normal intended use conditions of the undergarment.

There is no a priori limit to the size of each section of protective fabrics 12 and 14 (i.e. areas 30 and 32). In some variants, a garment may comprise a small number of overlapping fabric sections, as shown for example on FIGS. 8a-8d. In other variants, a given section of protective fabric may be have a rectangular or hexagon shape being, for example, sized to about one (1) square inch.

Figure 9:
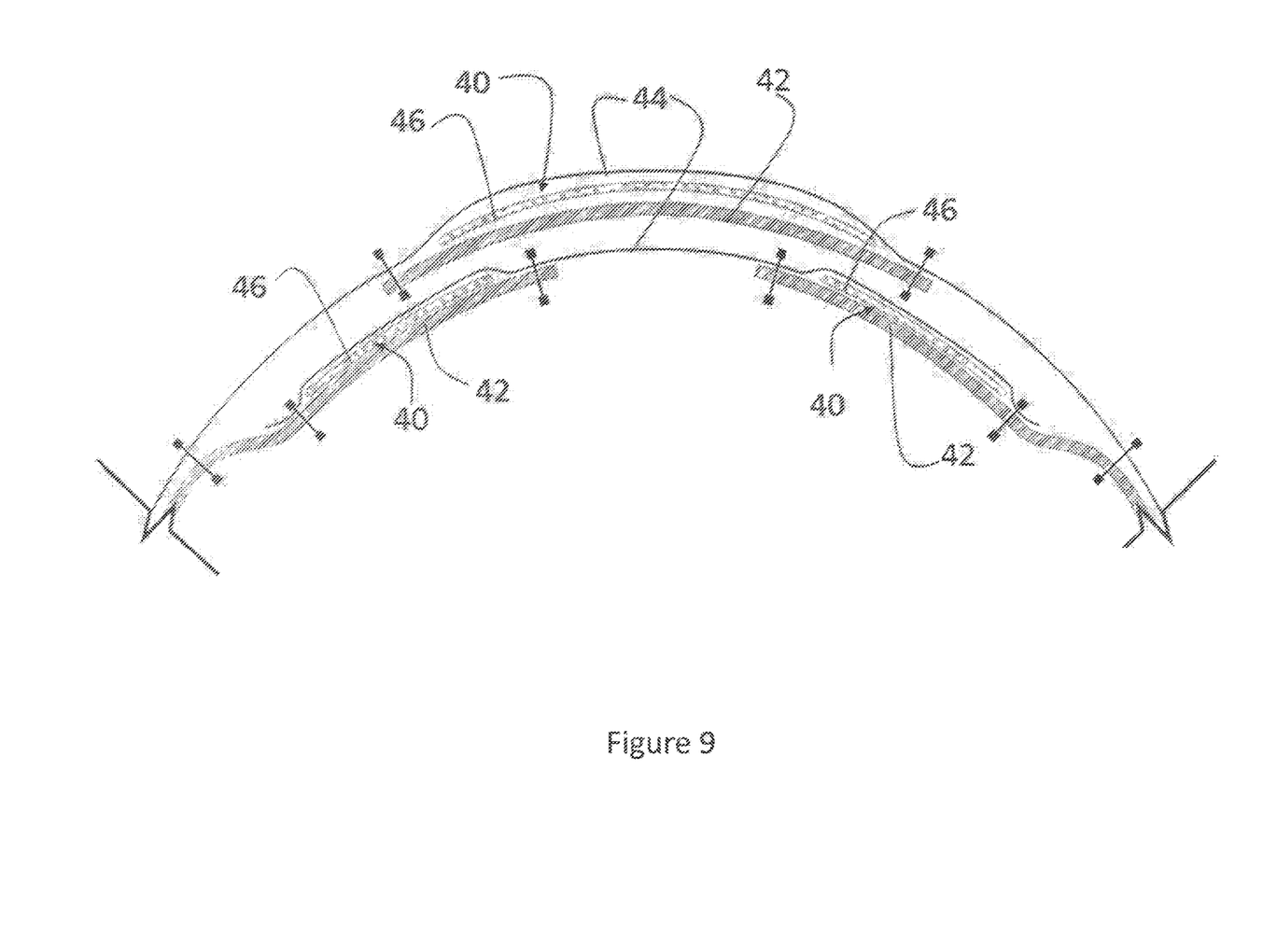
FIG. 9 is cross-sectional view of the present protective stretchable material according to a second embodiment.

FIG. 9 is cross-sectional view of the present protective stretchable material according to a second embodiment. Only elements of FIG. 9 not previously introduced in the foregoing description of FIG. 1 will now be discussed. Pockets 40 are formed between a layer of protection material such as 42 and a layer of stretch material such as 44. In the embodiment shown on FIG. 9, the protection material 42 may be non-stretchable and rigid, or may alternatively be stretchable and/or flexible. Inserts 46 made of protection material are placed within the pockets 40. Pockets 40 may also be formed by two layers of non protective, stretch material 44. The pockets 40 are either configured (e.g. by the manner in which they are sown or otherwise assembled) so that the inserts 46 are permanently affixed therein or so that the inserts 46 are removable.

Figure 10:
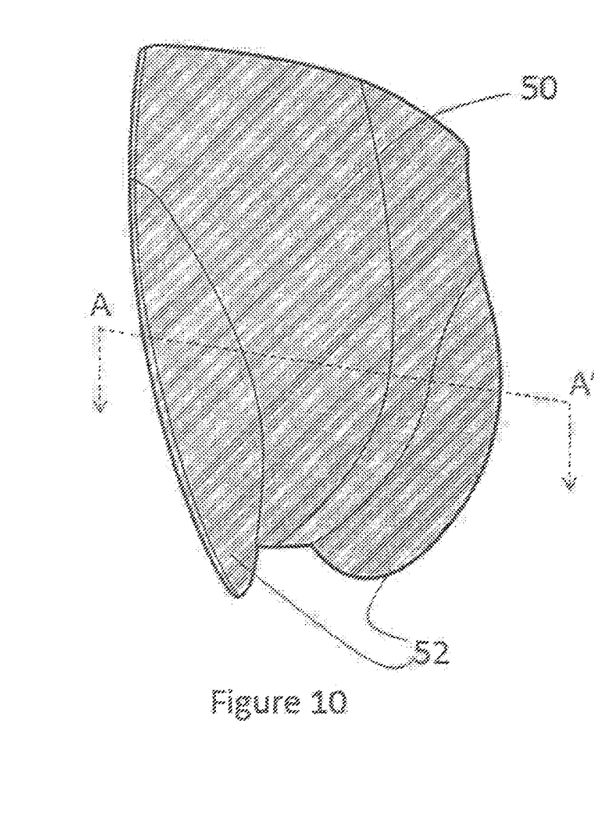
FIG. 10 is a perspective view of a protective fabric configured to protect male genitalia.

FIG. 10 is a perspective view of a protective fabric configured to protect male genitalia. A cup 50 is provided with two (2) side extensions 52, also called wings, covering the junction between the wearer's pelvic region and thighs and covering at least in part the wearer's thighs. The cup 50 and the side extensions 52 are configured for use with the undergarment introduced in the description of FIG. 5. The cup 50 and the side extensions 52 may be permanently affixed to the undergarment, or may be inserted in a suitably formed pocket. The side extensions 52 are configured to overlap, at least partially, with protective fabric of the undergarment covering the thighs so that at least partial overlap of the protective fabrics is maintained during use of the undergarment.

Figure 11:
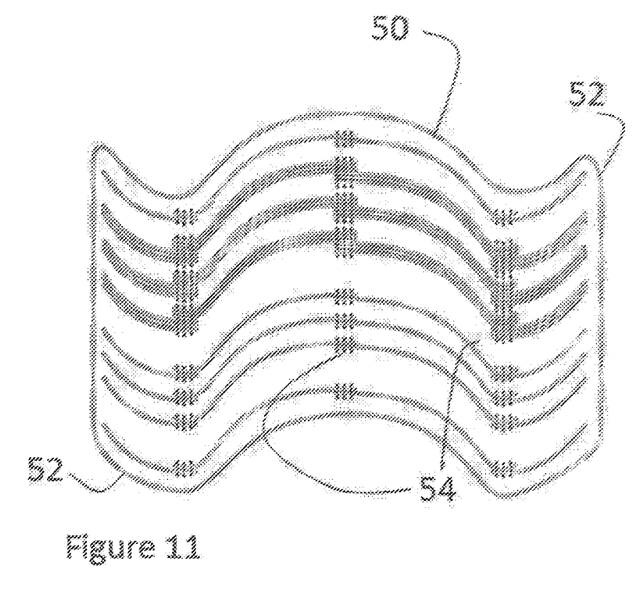
FIG. 11 is a cross sectional view of the protective fabric of FIG. 10 taken along line A-A.

FIG. 11 is a cross sectional view of the protective fabric of FIG. 10 taken along line A-A. A thickness of the material forming the cup 50 and the side extensions 52 is greatly exaggerated in order to better illustrate its construction. A number of layers shown on FIG. 11 is for illustration purposes only. Seems 54 shown between the cup 50 and the side extensions 52 or between halves of the cup 50 may be sown, glued, or assembled in other manners known in the art. As shown on FIG. 11, materials of the cup 50 and of the side extensions 52 may overlap at least in part at the seems 54 in order to provide continuous protection. In a variant, each layer of the cup 50 and of the side extensions 50 may be molded of a single material. A number of layers forming the protective fabric configured to protect male genitalia and the type of materials used may vary according to the needs of a particular intended use. In some variants, layers of polyethylene, Kevlar, carbon film made of carbon nanotubes, or combinations of layers made of these materials may be used.

Figure 12:
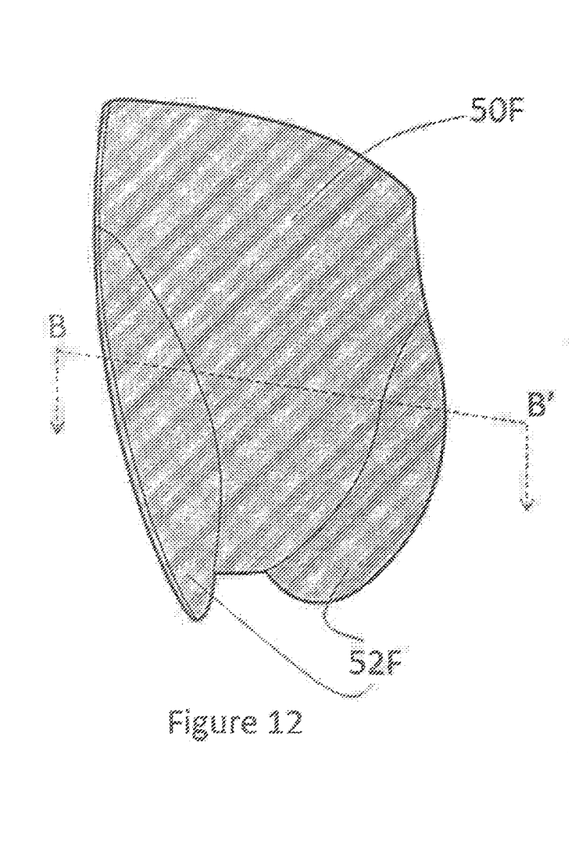
FIG. 12 is a perspective view of a protective fabric configured to protect female genitalia.
Figure 13:
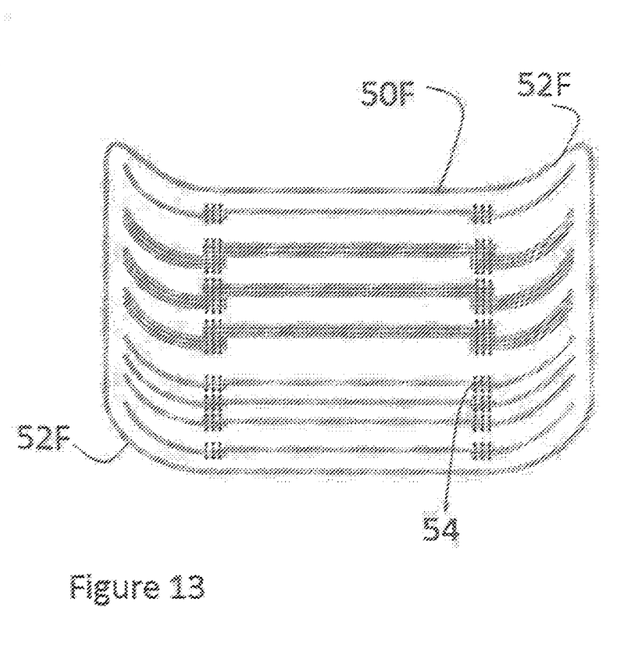
FIG. 13 is a cross sectional view of the protective fabric of FIG. 11 taken along line B-B.

FIG. 12 is a perspective view of a protective fabric configured to protect female genitalia. FIG. 13 is a cross sectional view of the protective fabric of FIG. 11 taken along line B-B. A protector 50F having side extensions 52F is similar to the cup 50 and to the side extensions 52 in terms of construction.

Figure 14:
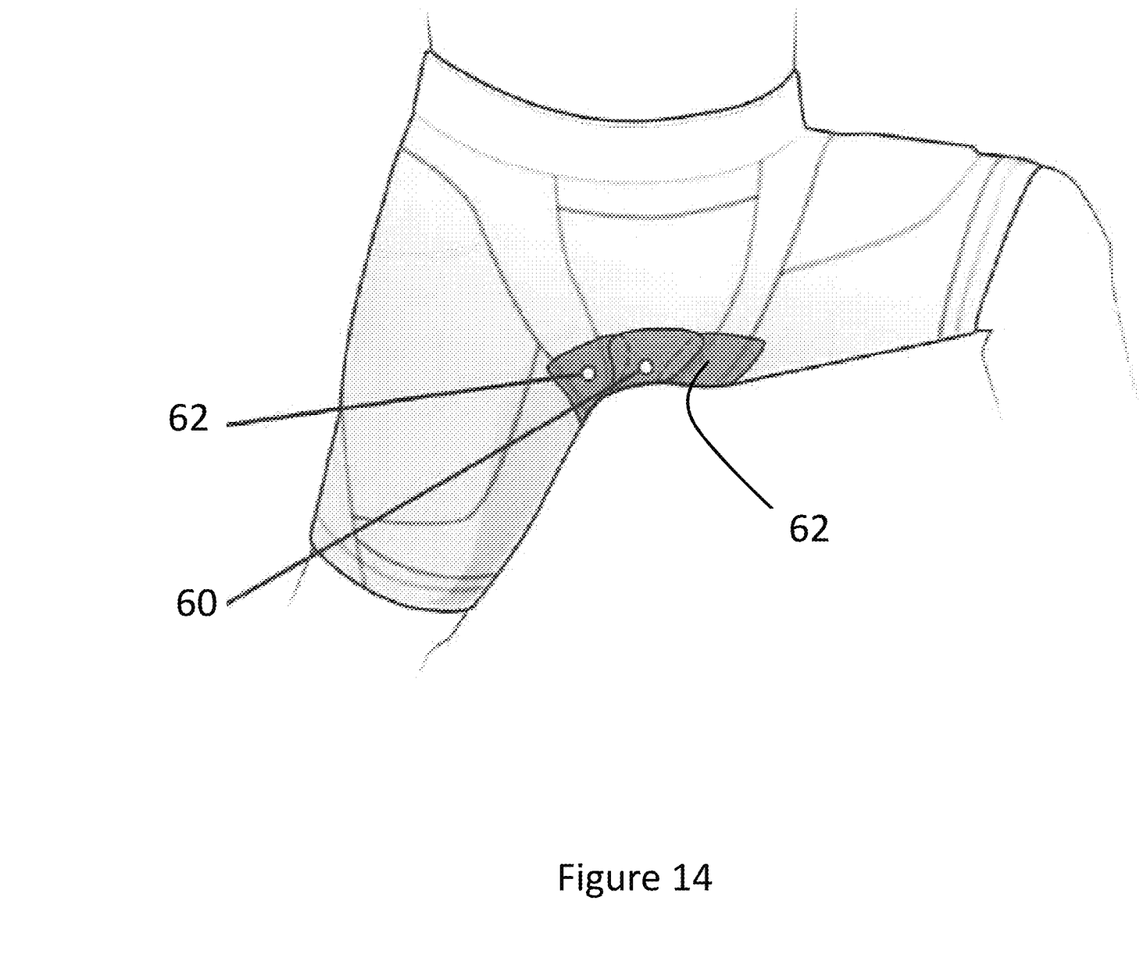
FIG. 14 is a perspective view of the undergarment of FIGS. 5-6 further showing a protective fabric configured to protect male or female perineum region.

FIG. 14 is a perspective view of the undergarment of FIGS. 5-6 further showing a protective fabric configured to protect male or female perineum region. A protective fabric 60, including side extensions 62 are configured for use with the undergarment introduced in the description of FIG. 5. The protective fabric 60, including side extensions 62 may be permanently affixed to the undergarment, or may be inserted in a suitably formed pocket. Fabrication of the protective fabric 60 and of the side extensions 62 may be similar to that of the cup 50 and of its side extensions 52.

Although the present protective stretchable material and garment have been described in the foregoing description by way of illustrative embodiments thereof, these embodiments can be modified at will, within the scope of the appended claims without departing from the spirit and nature of the appended claims.

What is claimed is:

1. A protective stretchable material comprising:
a first protective fabric;
a second protective fabric partially superposing the first protective fabric; and
a stretchable structure having first and second complementary layers, the first layer including the first protective fabric affixed to a first stretchable material, the second layer including the second protective fabric affixed to a second stretchable material, the stretchable structure allowing movement of the first protective fabric with respect to the second protective fabric while remaining partially superposed upon stretching of the stretchable structures;
wherein the first and second layers are contiguous through a thickness of a panel formed by the stretchable structure.

2. The material of claim 1, wherein the first and second protective fabrics are any one or combination of the followings: impact absorption fabrics, impact dispersion fabrics, ballistic-grade fabrics, puncture grade fabrics, high resistance yarns.

3. The material of claim 1, wherein the first and second stretchable materials include any of the following textiles: stretchable fabrics with or without spandex or elastane.

4. The material of claim 1, wherein the stretchable structure provides two-way stretch to the first and second protective fabrics.

5. The material of claim 1, wherein the stretchable structure provides four-way stretch to the first and second protective fabrics.

6. The material of claim 1, further comprising a third protective fabric partially superposing the first protective fabric and affixed to the stretchable structure in such a manner as to allow movement of the third protective fabric with respect to the first protective fabric while remaining partially superposed upon stretching of the stretchable structure.

7. The material of claim 1, wherein the first and second protective fabrics are affixed to the stretchable structure by at least one of the following technique: stitching, laminating, heat welding, high-frequency welding, gluing, tacking, and stapling.

8. The material of claim 1, wherein one or more of the first and second protective fabrics is flexible.

9. The material of claim 1, wherein one or more of the first and second protective fabrics is stretchable.

10. The material of claim 1, wherein the stretchable structure comprises a plurality of partially overlapping pockets.

11. A protective stretchable material comprising:
a first protective fabric;
a second protective fabric partially superposing the first protective fabric; and
a stretchable structure having first and second complementary layers, the first layer including the first protective fabric affixed to a first stretchable material, the second layer including the second protective fabric affixed to a second stretchable material, the stretchable structure allowing movement of the first protective fabric with respect to the second protective fabric while remaining partially superposed upon stretching of the stretchable structure;

wherein the stretchable structure comprises a plurality of partially overlapping pockets; and wherein the first and second protective fabrics are each inserted in separate ones of the partially overlapping pockets.

12. The material of claim 11, wherein at least one of the first and second protective fabrics is removably inserted in one of the partially overlapping pockets.

13. A protective stretchable material comprising:
a first protective fabric;
a second protective fabric partially superposing the first protective fabric; and
a stretchable structure having first and second complementary layers, the first layer including the first protective fabric affixed to a first stretchable material, the second layer including the second protective fabric affixed to a second stretchable material, the stretchable structure allowing movement of the first protective fabric with respect to the second protective fabric while remaining partially superposed upon stretching of the stretchable structure;
wherein at least one of the first and second protective fabrics is affixed in a pocket formed in the stretchable structure.

14. The material of claim 13, wherein the at least one of the first and second protective fabrics is removably inserted in the pocket.

15. A garment having at least a section made of the material of claim 1.

16. The garment of claim 15, wherein the garment is an undergarment.

17. The garment of claim 16, wherein one of the first and second protective fabrics is configured to cover a wearer's genitalia.

18. The garment of claim 17, wherein the one of the first and second protective fabrics forms a cup configured to cover male genitalia.

19. The garment of claim 17, wherein the one of the first and second protective fabrics is configured to cover female genitalia.

20. The garment of claim 17, wherein the one of the first and second protective fabrics is further shaped to provide extensions covering the junction between the wearer's pelvic region and thighs and covering at least in part the wearer's thighs.

21. The garment of claim 20, wherein the extensions overlap at least in part an other one of the first and second protective fabrics.

22. The material of claim 1, wherein:
the first stretchable material is affixed to the second layer in a section of the stretchable structure where the first and second protective fabrics are not superposed; and
the second stretchable material is affixed to the first layer in an other section of the stretchable structure where the first and second protective fabrics are not superposed.

23. The material of claim 1, wherein none of the first and the second protective fabrics is stretchable.

24. The material of claim 6, wherein the third protective fabric is included in one of the first or second layer.

* * * * *